United States Patent  
Shank et al.

(10) Patent No.: US 12,141,307 B2
(45) Date of Patent: Nov. 12, 2024

(54) MASKING SENSITIVE INFORMATION WHILE SCREENSHARING HTML ELEMENTS

(71) Applicant: Glance Networks, Inc., Wakefield, MA (US)

(72) Inventors: Kyle Shank, Newburyport, MA (US); Ankit Desai, Brooklyn, NY (US); Edward F. Hardebeck, Brookline, MA (US); Richard L. Baker, Belmont, MA (US); Joseph R. Belmonte, Milton, MA (US)

(73) Assignee: Glance Networks, Inc., Wakefield, MA (US)

(*) Notice: Subject to any disclaimer, the term of this patent is extended or adjusted under 35 U.S.C. 154(b) by 321 days.

(21) Appl. No.: 17/737,363

(22) Filed: May 5, 2022

(65) Prior Publication Data

US 2022/0358234 A1 Nov. 10, 2022

Related U.S. Application Data

(60) Provisional application No. 63/185,108, filed on May 6, 2021.

(51) Int. Cl.
*G06F 21/62* (2013.01)
(52) U.S. Cl.
CPC .............. *G06F 21/6218* (2013.01)
(58) Field of Classification Search
CPC .................................................. G06F 21/6218
See application file for complete search history.

(56) References Cited

U.S. PATENT DOCUMENTS

| 8,484,291 B1 * | 7/2013 | Topolcic | G06F 9/452 |
| | | | 709/208 |
| 9,602,560 B1 | 3/2017 | Moody et al. | |
| 10,289,296 B1 * | 5/2019 | Zhang | G06F 40/14 |
| 11,006,077 B1 * | 5/2021 | Truong | H04N 7/15 |

(Continued)

OTHER PUBLICATIONS

*International Search Report and Written Opinion* from corresponding PCT application PCT/US22/27807, dated May 5, 2022 (9 pages).

*Primary Examiner* — Vance M Little
(74) *Attorney, Agent, or Firm* — Anderson Gorecki LLP

(57) ABSTRACT

Masking JavaScript in an embedded browser of an application display identifies areas within the embedded browser that are to be masked to a screensharing client, to enable the screensharing client to redact corresponding regions of the application display when the application display is transmitted on a screenshare session. A list of CSS selectors is provided to the masking script identifying HTML elements in the DOM that are to be masked. The masking script determines the locations and sizes of the HTML elements within the embedded browser and reports the masked areas to a screensharing client. The screensharing client correlates the masked areas within the embedded browser to regions of the application display containing the embedded browser. The screensharing client redacts the correlated regions from the screensharing data and does not transmit the redacted regions to prevent information appearing in the redacted regions from being transmitted on the screenshare session.

18 Claims, 5 Drawing Sheets

(56) References Cited

U.S. PATENT DOCUMENTS

| | | | |
|---|---|---|---|
| 2012/0036452 A1* | 2/2012 | Coleman | G06F 21/55 |
| | | | 715/751 |
| 2012/0173966 A1* | 7/2012 | Powell | H04L 67/02 |
| | | | 715/234 |
| 2015/0160813 A1 | 6/2015 | Lee | |
| 2017/0004331 A1 | 1/2017 | Welden et al. | |
| 2017/0178234 A1 | 6/2017 | Jezek et al. | |
| 2017/0213369 A1* | 7/2017 | Lv | G06F 21/6245 |
| 2020/0218961 A1* | 7/2020 | Kanazawa | A61H 33/06 |

* cited by examiner

Screenshare Task

Masking JavaScript

MASKING SENSITIVE INFORMATION WHILE SCREENSHARING HTML ELEMENTS

CROSS REFERENCE TO RELATED APPLICATIONS

This application claims priority to provisional application No. 63/185,108, entitled Masking Sensitive Information While Screensharing HTML Elements, filed May 6, 2021, the content of which is hereby incorporated herein by reference.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

FIELD

The field relates to communication sessions and, more particularly, to a method and apparatus for masking sensitive information while screensharing HTML elements.

SUMMARY

The Summary and Abstract sections are provided herein to introduce some concepts discussed in the Detailed Description below. The Summary and Abstract sections are not comprehensive and are not intended to delineate the scope of protectable subject matter, which is set forth by the Claims presented below.

All examples and features mentioned below can be combined in any technically possible way.

Masking JavaScript in an embedded browser identifies areas within the embedded browser that are to be masked. The list of areas is provided to a screensharing client, to enable the screensharing client to redact corresponding regions of the application display that is being transmitted on a screenshare session. A list of CSS selectors is provided to the masking script identifying HTML elements in the Document Object Model (DOM) that are to be masked. The masking script determines the locations and sizes of the HTML elements within the embedded browser and reports the masked areas to a screensharing client. The HTML elements are displayed locally, so that the content of the regions that are to be masked are visible on the visitor display. The screensharing client correlates the masked areas within the embedded browser to regions of an application display containing the embedded browser. The screensharing client redacts the correlated regions from the screensharing data and does not transmit the redacted regions to prevent information appearing in the redacted regions from being transmitted on the screenshare session. Thus, the content of the regions that are to be masked are visible on the visitor display, but are not visible on the agent display.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of some embodiments of the invention. However, those skilled in the art will appreciate that the invention may be practiced without these specific details. In other instances, well-known methods, procedures, components, protocols, algorithms, and circuits have not been described in detail so as not to obscure the invention.

Screensharing is the process of remotely viewing a dynamic image of a remote computer screen or application. Information on the screen of the first party is transmitted to a second party via a screenshare session and is visible to the second party at a remote computer. In this description the term "visitor" will be used to refer to a person who is running an application that is to be viewed remotely, and the term "agent" will refer to a person who receives information on the screenshare session and is able to view the visitor's display remotely. The terms "visitor" and "agent" may be used refer to a scenario in which the visitor has contacted a customer service agent for help with the application, but the same principles described herein can be used in other contexts as well and thus the use of the techniques described herein are not limited to this use case scenario.

Figure 1:
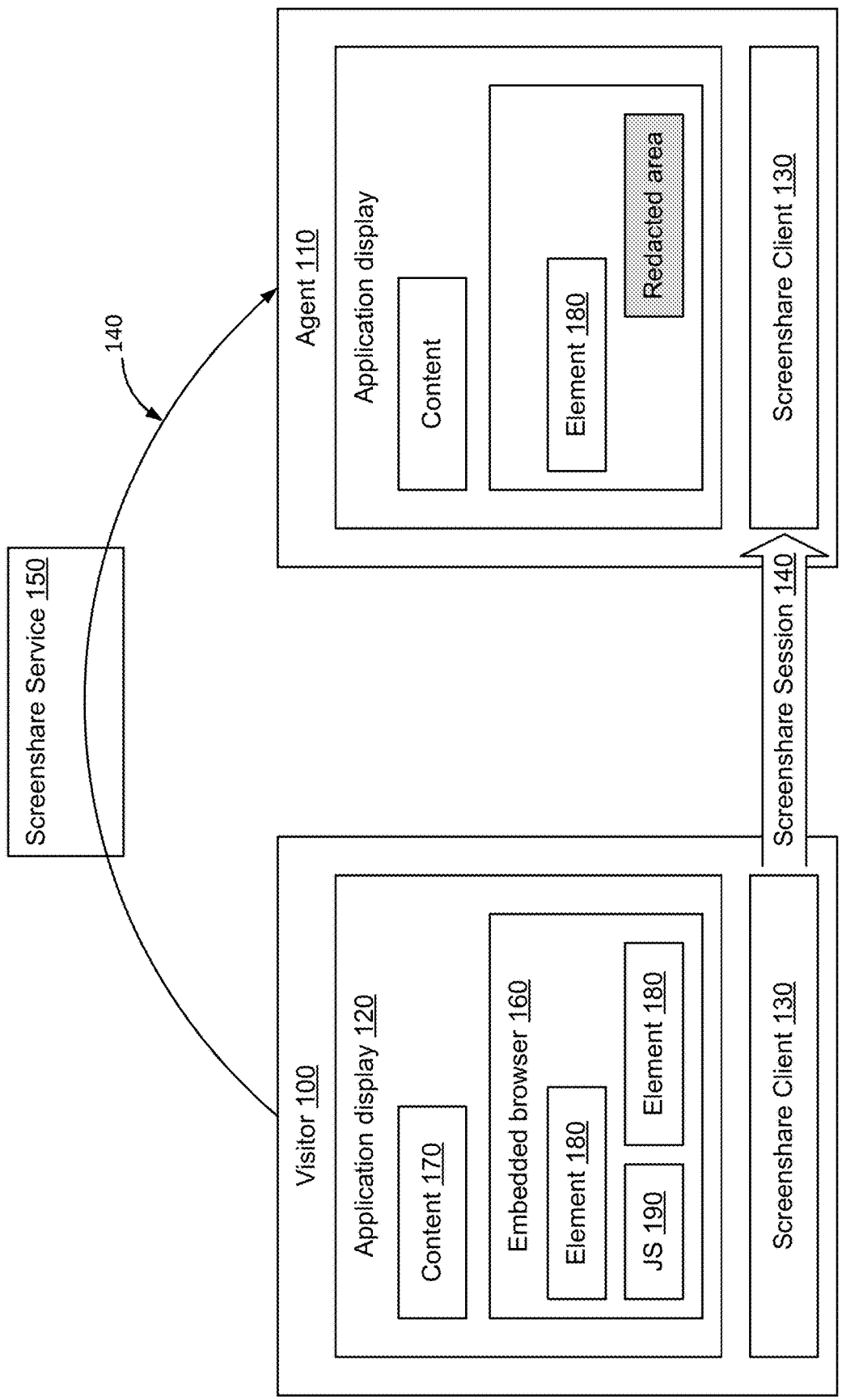
FIG. 1 is a functional block diagram of a screensharing environment including a visitor and agent, according to some embodiments.

FIG. 1 is a functional block diagram of a screensharing environment including a visitor 100 and agent 110, according to some embodiments. As shown in FIG. 1, visitor 100 has an application display 120 that the visitor would like to make visible to agent 110. Visitor 100 has screenshare client 130 configured to capture the content of the application display 120 and transmit a view of the display 120 on a screenshare session 140. Screenshare session, in some embodiments, is facilitated by a screenshare service 150 such that the visitor 100 transmits screenshare information to the screenshare service 150, and the screenshare service forwards the screenshare information on the screenshare session 140 to agent 110.

Screen sharing involves transmission of an image of what is shown on the visitor's display 120 on a screenshare session 140. In some embodiments, a screenshare client 130 on the visitor machine captures a view of what is shown on the visitor's display 120, or in a window associated with an application that is open on the visitor's display, and transmits images of what is shown on the visitor's display on the screenshare session. The images may be full images or updates to previously transmitted images. One example screensharing technology is described in U.S. Pat. No. 8,484,291, entitled Method and Apparatus for Selecting Commands for Transmission from an Update Queue, the content of which is hereby incorporated herein by reference.

As used herein, the term "display" will be used generically to refer to the portion of content that is shared on a screenshare session. The "display" may encompass the entirety of what is shown on a visitor's monitor, or to only a portion of what is shown on the visitor's monitor, such as what is shown within a particular window that is opened on the visitor's monitor. If the visitor is using a mobile device, the term "display" may refer to what is shown on the entirety of the mobile device's screen or to what is shown on a portion of the screen of the mobile device associated with an application that is running on the visitor's mobile device.

There are scenarios where some of the information that is being shown on the visitor's display 120 is sensitive or private. Preferably, this information should be kept private and not transmitted on the screenshare session 140. Keeping the information private prevents the information from ever leaving the visitor's control, prevents the screenshare service 150 from handling the sensitive information, and prevents the agent 110 from viewing the sensitive information. Masking sensitive information thus provides a security benefit to the visitor, by enabling the visitor to maintain control of the sensitive information and preventing dissemination of the sensitive information.

When the sensitive information is displayed in native application fields or controls, the screensharing system 130 may readily find the location of those controls (content 170) within the screen using typical API methods and redact (mask) those regions from the transmitted image. This prevents the sensitive information contained in content 170 from being transmitted, which means that the sensitive information does not leave the visitor's computer.

However, when the sensitive information appears in a HTML element 180 inside an embedded browser 160, redacting that information by the screenshare client 130 is not straightforward. Specifically, there are situations where the content of the DOM of the embedded browser 160 is not being transmitted from the visitor 100 to the agent 110, but rather an image of what is shown in the embedded browser 160 is transmitted by the screenshare client 130 from the visitor 100 to the agent 110. The screenshare client cannot use typical API methods to identify and locate the regions within the embedded browser 160 that should be masked, however. Accordingly, it would be advantageous to provide a method for masking sensitive information while screensharing HTML elements.

According to some embodiments, masking script 190 is downloaded to embedded browser 160. The masking script 190 includes a list of CSS selectors that identify HTML elements 180 that contain sensitive information that are to be masked on the screenshare session 140. The masking script identifies the locations and sizes of the HTML elements that are to be masked, and transmits the locations/sizes of the masked HTML elements to the screenshare client 130. The screenshare client uses the list of masked areas to determine the offset and size of areas to be redacted relative to the application image, and does not transmit the redacted portions of application display 120 on the screenshare session. For example, as shown in FIG. 1, the application display on the agent 110 includes a view of one of the HTML elements 180 that was not masked, but does not include a view of a second of the HTML elements 180 that was displayed in the visitor's view of the application display. By identifying regions of the embedded browser that should not be transmitted on the screenshare session, it becomes possible for the screenshare client 130 to effectively mask regions of application display 120, even where those regions are shown within an embedded browser 160.

Although an embodiment will be described in which the masking script 190 is described as being implemented using JavaScript, other forms of scripting language may be utilized as well. For example, JavaScript is an implementation of a scripting language standard by ECMA International in the ECMA-262 specification. Other implementations of this standard include JScript and ActionScript. Thus, although an implementation will be described in which JavaScript is used, the invention is not limited to this particular implementation as other forms of script may be used as well.

Figure 2:
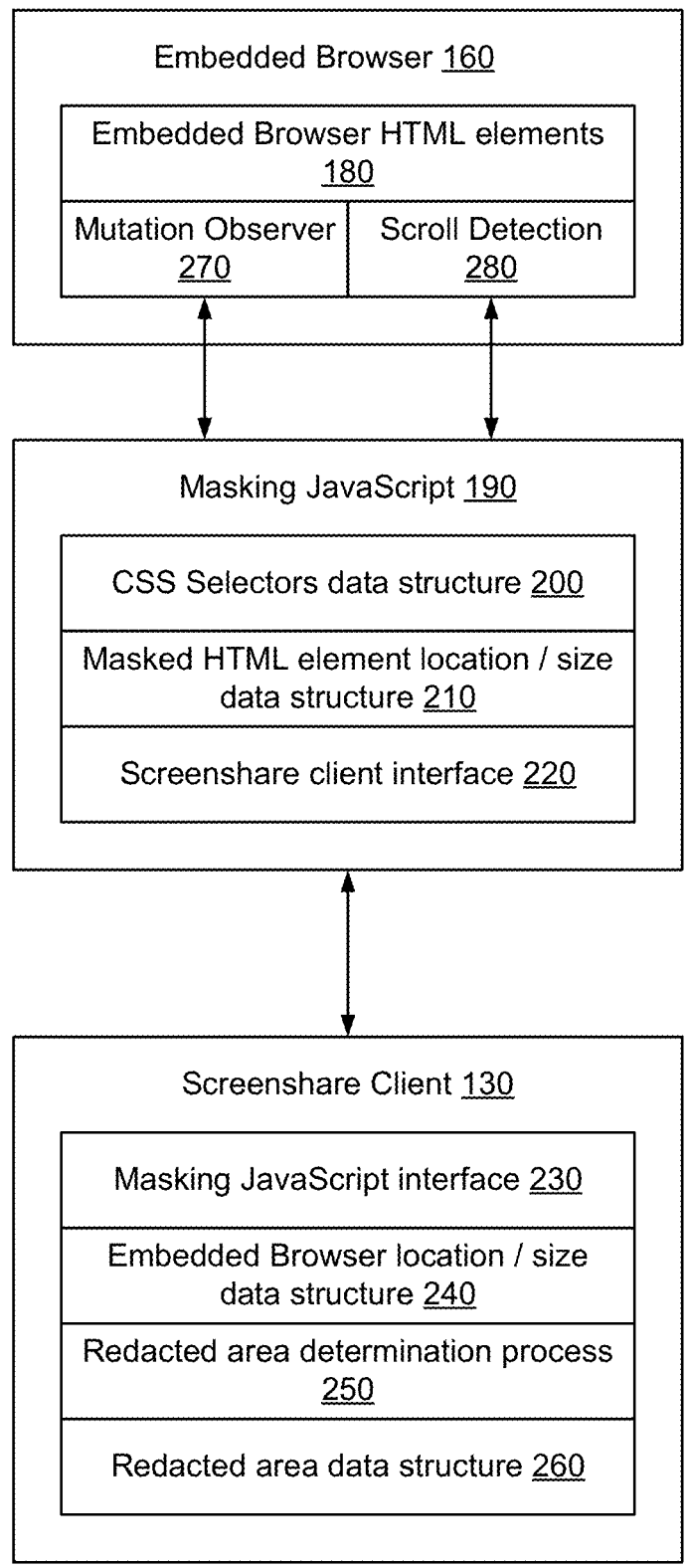
FIG. 2 is a functional block diagram of several processes configured to execute on a visitor computer to enable sensitive information to be masked while screensharing HTML elements of an embedded browser, according to some embodiments.

FIG. 2 is a functional block diagram of several processes configured to execute on a visitor computer 100 to enable sensitive information to be masked while screensharing HTML elements 180 of an embedded browser 160, according to some embodiments. As shown in FIG. 2, in some embodiments masking script 190 includes a list of CSS selectors stored in a CSS selector data structure 200. The CSS selectors identify embedded browser HTML elements 180 that contain sensitive information that should not be transmitted on the screenshare session 140.

The masking script 190 further includes a HTML element location/size data structure 210 that contains the location and size of the HTML elements 180 identified by the CSS selectors 200. The masking script 190 determines the location and size of each HTML element identified by the CSS selectors 200, and includes the location and size of the HTML element that is to be masked in the HTML element location/size data structure 210. In some embodiments, the location specifies an offset within the embedded browser, and the size specifies a rectangular region encompassing the HTML element that is to be masked. In some embodiments, the location and size are specified using the top left coordinate and bottom right coordinate of the HTML element relative to a location, such as the upper left-hand corner of the embedded browser, although other ways of specifying the location and size may be utilized depending on the implementation. Although an implementation is described herein in which the masking JavaScript is configured to specify rectangular regions to be redacted, in some embodiments the masking JavaScript may specify differently shaped areas to be redacted. For example, the masking JavaScript may identify an element with a CSS rotate or skew transforms, in which case the rectangles could be replaced with polygons (set of points). Thus, the particular shape of the masked regions may depend on the implementation, and may include spherical regions, oval shaped regions, rectangles, squares, or other types of polygons. Multiple sub-regions may also be used to create a composite masked region to enable masking of oddly shaped HTML elements.

The location of the embedded browser HTML elements may change for several reasons, which may affect the locations of the masked HTML elements to change within the embedded browser. Additionally, HTML elements may be added to the DOM or removed from the DOM. Accordingly, in some embodiments, the masking script 190 adds a mutation observer 270 to the embedded browser 160 to watch for changes to the DOM of the embedded browser. If the DOM of the embedded browser includes shadow DOM regions, mutation observers 270 may be added to any such shadow DOM region. Any time a DOM change is detected by the mutation observer 270, the masking script 190 recomputes the location of the HTML elements 180 identified by the CSS selectors 200, to update the entries of the locations and sizes of the masked HTML elements contained in the HTML element location/size data structure 210. Additional details associated with handling mutation events are presented below in connection with FIG. 5.

Likewise, a scroll event may occur within the embedded browser, which would cause the location of the HTML elements identified by the CSS selectors to change. Accordingly, in some embodiments, the masking script 190 adds a scroll detection observer 280 to the embedded browser 160 to watch for scroll events. Since scroll events cause relative movement in an up/down or left/right direction, scroll events may be handled differently by the masking script by causing the previously calculated HTML element locations to be scrolled by the determined scroll value. Additional details associated with handling scroll events are presented below in connection with FIG. 5.

It is also possible for the list of CSS selectors contained in the CSS selectors data structure 200 to change. Where this occurs, the masking script 190 will re-process the list of CSS selectors 200 to create a new list of areas that should be redacted and store the new list of redacted areas in the HTML element location/size data structure 210. Additional details associated with handling CSS selector updates are presented below in connection with FIG. 4.

The masking script 190 has a screenshare client interface 220 that the masking script 190 uses to communicate with the screenshare client 130. In some embodiments, the masking script 190 uses the screenshare client interface 220 to provide the list of regions within the embedded browser that should be masked to the screenshare client 130. In some embodiments the screenshare client 130 has a corresponding masking script interface 230.

In some embodiments, the screenshare client 130 has an embedded browser location/size data structure 240 that is used to maintain the location of the embedded browsers within the application display 120. The screenshare client 130 receives the list of masked elements from the masking script 190, which reference areas within the embedded browser(s), and uses a redacted region determination process 250 to correlate the regions of the embedded browser to regions of the application display 120, which are the portions of the application display 120 that should be redacted. These redacted regions are stored in a redacted region data structure 260. The embedded browser location/size data structure 240 and redacted region data structures 260 may be implemented using a single data structure, depending on the implementation.

Figure 3:
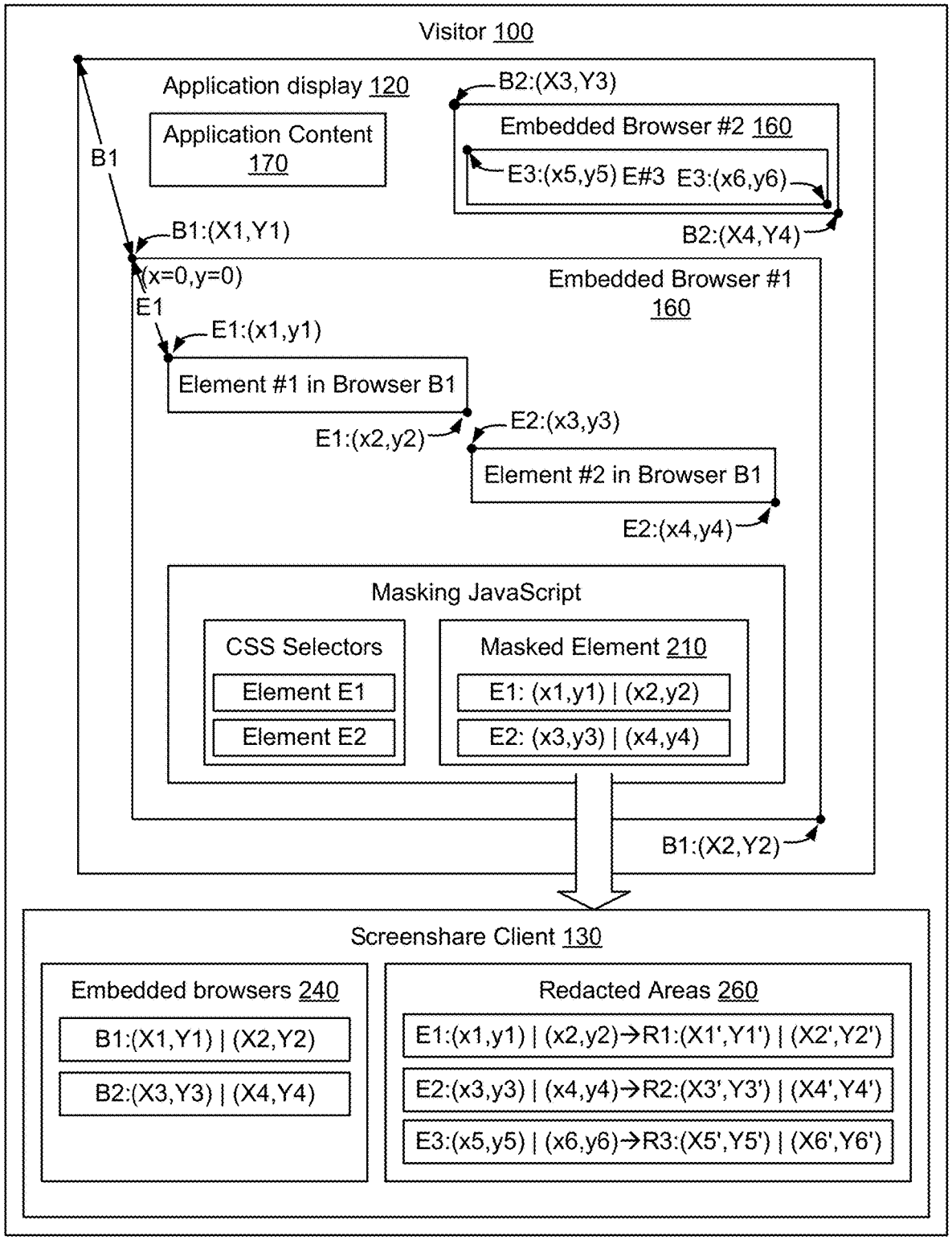
FIG. 3 is a functional block diagram of the visitor computer of FIG. 2 in greater detail, according to some embodiments.

FIG. 3 is a functional block diagram of the visitor computer 100 of FIG. 2 in greater detail, according to some embodiments. As shown in FIG. 3, the application display 120 includes application content 170 that is natively drawn and a portion of the application display 120 that is generated using an embedded browser 160.

The location of the embedded browser and the size of the embedded browser, in some embodiments, is identified by the screenshare client 130 using two offset values identifying the top left corner of the embedded browser B1:(X1,Y1) and the bottom right corner of the embedded browser B1:(X2,Y2). The location of the embedded browser may be stored in the embedded browsers data structure 240. In this description (X,Y) coordinate values that are in capital letters indicate offset values relative to the application display 120, whereas (x,y) values that are in lower letters indicate offset values within an embedded browser relative to the boundary of the embedded browser. Accordingly, as shown in FIG. 3, masking script determines the location of elements that are to be masked within the embedded browser window, and stores the locations and sizes of the masked elements in masked element data structure 210. An example way of identifying the location and size of the masked elements, may be to determine and store the location of the upper left corner and lower right corner of the masked element. Other embodiments may identify the locations and sizes of the masked elements using other methodologies.

The screenshare client 130 uses the location of the embedded browser B1:(X1,Y1)|(X2,Y2), and the offset and size coordinates of the region to be masked within the embedded browser E1:(x1,y1)|(x2,y2) to determine a portion of the application display 120 that should be redacted R1:(X1',Y1')|(X2',Y2').

If the coordinates of the application display 120 are based on the same scale as the coordinates of the embedded browser 160, the location of the redacted regions R may be determined by adding the offset location of the embedded browser B1:(X1,Y1)|(X2,Y2) and the location of the region to be masked within the embedded browser E1:(x1,y1)|(x2,y2):

$$R1=B1+E1 \rightarrow R1: (X1+x1,Y1+y1)|(X2+x2,Y2+y2).$$

If the coordinate scale used to determine the offset of the masked regions within the embedded browser 160 are different from the coordinate scale used by the application display 120, a scaling factor W may be applied to the locations of the masked elements within the embedded browser to determine the locations of the redacted regions R of application display that should be masked. Specifically, R1=B1+W*E1, in which the region to be masked R1 is equal to the location of the embedded browser B1 plus the converted location of the masked element W*E1 within the embedded browser:

$$R1=B1+W*E1 \rightarrow R1: (X1+W*x1,Y1+W*y1)|(X2+W*x2,Y2+W*y2).$$

Figure 4:
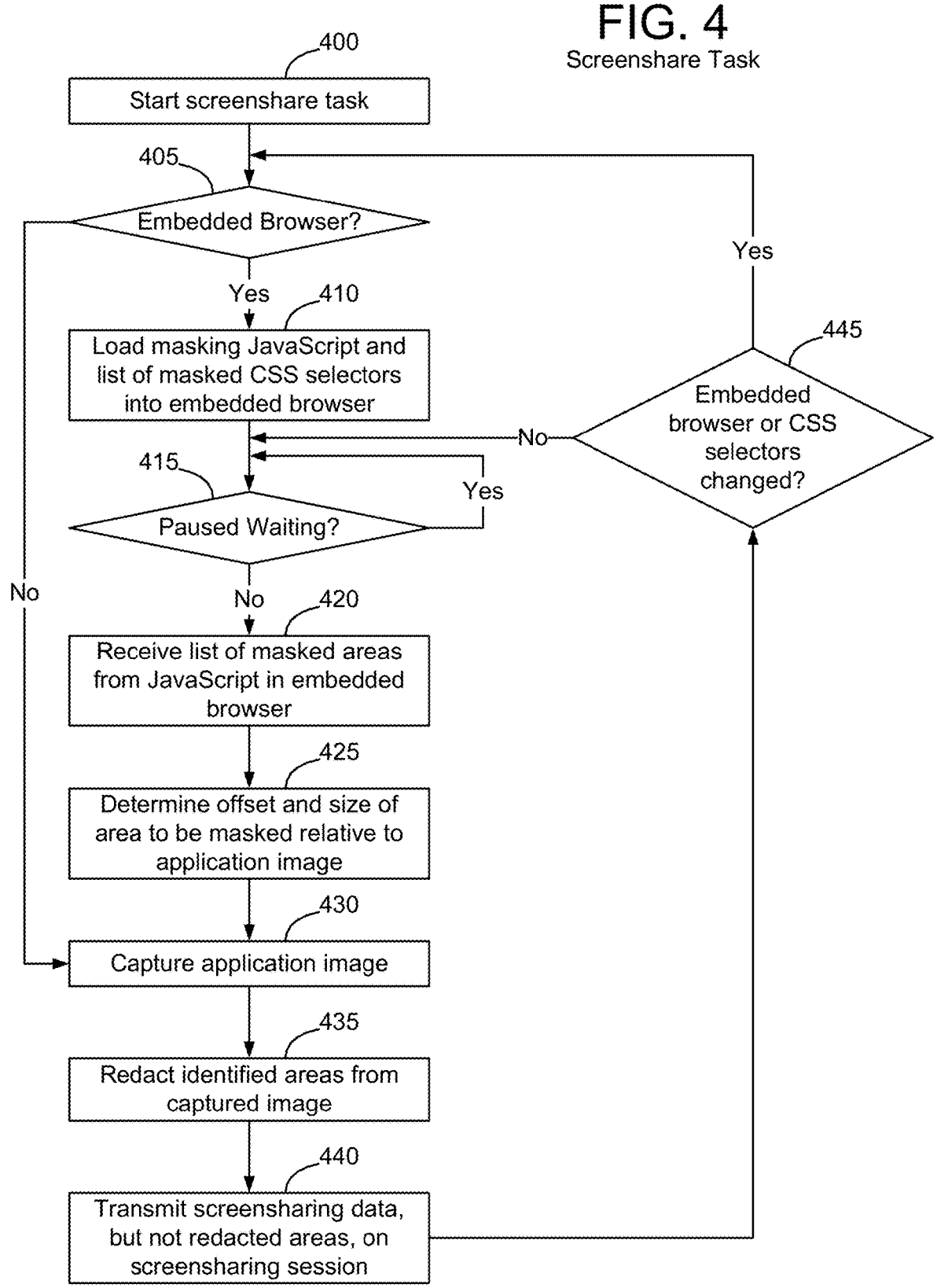
FIG. 4 is a flow chart of a process implemented by a screenshare task on the visitor computer, according to some embodiments.

FIG. 4 is a flow chart of a process implemented by a screenshare task on the visitor computer, according to some embodiments. As shown in FIG. 4, if a view of an application display 120 is to be transmitted on a screenshare session, a screenshare task is started (block 400). The screenshare task, in some embodiments is implemented using screenshare client 130. Screenshare client 130 may be implemented as an asynchronous task that transmits information shown on application display 120, and changes to the information shown on application display 120 on screenshare session 140 via screenshare service 150.

In some embodiments, the screenshare client 130 is configured to determine whether any portion of the application display 120 is implemented using an embedded browser 160 (block 405). If the screenshare client 130 determines that the application display does not include an embedded browser (a determination of NO at block 405), masking elements of the embedded browser is not required, and the screenshare client 130 can proceed to capture the application image and changes to the application image (block 430) and transmit screenshare information (block 440). If any natively drawn elements are to be masked, the screenshare task optionally may redact the selected natively drawn masked elements (block 435).

If the screenshare client 130 determines that the application display 120 includes an embedded browser 160 (a determination of YES at block 405), local masking JavaScript and a list of masked CSS selectors are loaded to the embedded browser (block 410). The screenshare task pauses (block 415) until it receives a list of areas within the embedded browser that are to be redacted (block 420). In some embodiments, the list of areas within the embedded browser are generated by masking script 190. An example process that the masking script 190 can use to generate the list of areas within the embedded browser that are to be masked is described below in connection with FIG. 5.

Once the screenshare client 130 receives the list of areas within the embedded browser that are to be masked (block 420), the screenshare client 130 will determine the offset and size of the regions that are to be redacted relative to the application image (block 425), e.g., the screenshare client 130 determines the redacted regions: R1:(X1',Y1')|(X2', Y2'), R2, . . . Rn. The screenshare client 130 captures the application image (block 430) and redacts the content of the identified masked regions from the screensharing image (block 435). The screenshare task then transmits the screensharing data, but not the redacted regions, on the screensharing session (block 440). Optionally the screenshare client 130 may transmit an instruction to fill the redacted regions with a particular solid color so that the view of the application display on the agent 110 shows the regions using a solid color to indicate that those regions have been redacted.

In some embodiments, in block 430, the screenshare client captures the entire image of the application display 120, and then removes the portions of the image that correspond to the redacted regions. In other embodiments, in block 430, the screenshare client determines the redacted regions before capturing the application image, and does not capture the content of the redacted regions. In embodiments where the content of the redacted regions is not captured, the screenshare client 130 on the visitor side can insert a command to the screenshare client 130 on the agent side to cause the screenshare client 130 on the agent side to fill in the redacted region with a solid color or other predetermined content.

There are instances where the embedded browser or the CSS selectors may change (block 445). Updating the list of CSS selectors can cause HTML elements that previously were masked to now be unmasked, or can cause HTML elements that previously were unmasked to now be masked. If no change is detected (a determination of NO at block 445) the screenshare task will return to block 415 and use the list of masked elements provided by the JavaScript. If a change is detected to the embedded browser or CSS selectors, the process will return to block 405 to determine whether there is an embedded browser (block 405) and, if so, load masking script and list of masked CSS selectors into the embedded browser. Reloading the masking JavaScript and new list of masked CSS selectors will cause the JavaScript to generate an updated list of masked areas.

Figure 5:
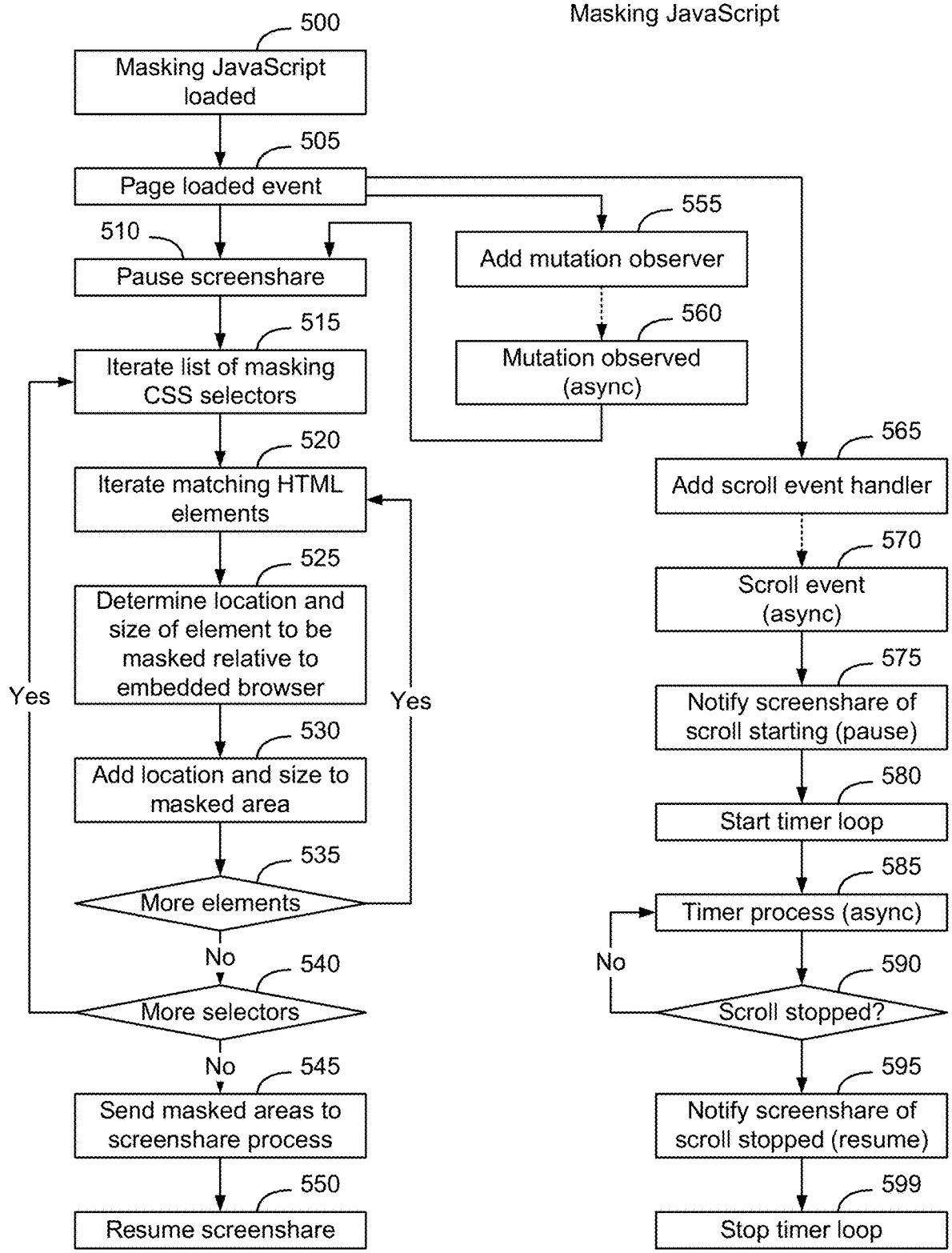
FIG. 5 is a flow chart of a process implemented by masking script running in an embedded browser on the visitor computer, according to some embodiments.

FIG. 5 is a flow chart of a process implemented by masking script 190 running in an embedded browser 160 in application display 120 on the visitor computer 100, according to some embodiments. Masking script 190 may be implemented using JavaScript or other script designed to run within the embedded browser 160. As shown in FIG. 5, if portions of an embedded browser 160 are to be masked, masking script 190 is loaded to the embedded browser 160 (block 500). In some embodiments, the masking script 190 may be loaded to the embedded browser 160 from the screenshare client 130.

When a page load event occurs (block 505), a mutation observer is added to the page (block 555) and a scroll event handler is added to the page (block 565). The mutation observer 270 watches for changes to the DOM of the browser, and the scroll event handler 280 watches for scroll events within the embedded browser 160.

The screenshare task is paused (block 510) and the masking script 190 will iterate a list of masking CSS selectors 200 (block 515). For each CSS selector in the list of masking CSS selectors, the masking script will iterate matching HTML elements (block 520) to identify HTML elements in the embedded browser to be masked. The masking JavaScript determines the location and size of the HTML element to be masked relative to the browser (block 525) and adds the location and size of the HTML element to be masked to a list of masked areas (block 530).

A determination is then made if there are any additional HTML elements that match the current CSS selector (block 535). If there are additional HTML elements that match the current CSS selector (a determination of YES at block 535) the process returns to block 520, a subsequent HTML element is selected, and the location and size of the subsequent HTML element is determined. This process iterates for all HTML elements matching the current CSS selector. If there are no additional HTML elements that match the current CSS selector (a determination of NO at block 535) a determination is made as to whether there are additional masking CSS selectors to be processed (block 540). If there are additional masking CSS selectors (a determination of YES at block 540) the process returns to block 515 to select a subsequent CSS selector. The masking CSS selectors are processed until there are no additional CSS selectors to be processed (a determination of NO at block 540). The list of masked areas are then sent to the screenshare process (block 545) and the screenshare task resumes (block 550). Receipt of the list of masked areas by the screenshare task is implemented at block 420 of FIG. 4.

There are instances where the Document Object Model (DOM) of the embedded browser may change (mutation event). A mutation event can involve the addition of one or more HTML elements to the embedded browser DOM, removal of one or more HTML elements from the embedded browser DOM, a combination of addition and removal of HTML elements, or the reorganization of the HTML elements, for example in connection with scaling of the embedded browser 160. If a mutation to the DOM is observed by mutation observer (block 560) the screenshare task is paused (block 510), and the masking JavaScript re-processes the list of CSS selectors against the HTML elements of the updated DOM to generate a new list of masked areas (blocks 515-550).

The location of HTML elements within an embedded browser may also change, for example in connection with a scroll event. A scroll event can involve vertical movement of the HTML content of the embedded browser, horizontal movement of the HTML content of the embedded browser, or a combination of vertical and horizontal movement of the HTML content of the embedded browser. If a scroll event in the embedded browser 160 is detected by the scroll event handler (block 570) the masking script notifies the screenshare task that a scroll event has started (block 575) which will cause the screenshare task to pause. The masking script starts a timer loop 580 and an asynchronous timer process is started (block 585). Upon expiration of a predetermined amount of time, a determination is made as to whether the scroll event has stopped (block 590). If the scroll event has not stopped (a determination of NO at block 590), the process returns to block 585 where the timer is started. The process iterates to periodically determine whether the scroll event has stopped. If the scroll event has stopped (a determination of YES at block 590) the screenshare process is notified that the scroll event has stopped (block 595) and the offset value associated with the scroll event is provided to the screenshare client. The timer loop then ends (block 599).

The screensharing task updates the location of the redacted regions using the scrolling offset, and resumes transmission of screensharing data, but not the redacted regions, on the screensharing session. In some embodiments the screensharing task is configured to handle scroll actions on the application display 120 by causing previously transmitted images of the application display 120 to be moved relative to a previously drawn location on the agent view of the application display. This enables the same images to be simply moved at the agent display rather than requiring new images to be transmitted on the screenshare session. By implementing scroll actions within the embedded browser 160 in the same manner, and applying the scroll offset at the screensharing client, it is possible to minimize the amount of information that must be transmitted on the screenshare session.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, computer instructions that are stored on a non-transitory tangible computer-readable medium and implemented by multi-purpose tangible processors, and any combinations thereof.

The methods described herein may be implemented as software configured to be executed in control logic such as contained in a CPU of an electronic device such as a computer. The functions described herein may be implemented as sets of program instructions that are stored in a non-transitory tangible computer readable medium. When implemented in this manner, the computer program includes a set of instructions which, when executed by a computer, cause the computer to perform a method to implement the functions described above. Programmable logic can be fixed temporarily or permanently in a non-transitory tangible computer readable medium such as a read-only memory chip, a computer memory, a disk, or other storage medium. In addition to being implemented in software, the logic described herein can be embodied using discrete components, integrated circuitry, programmable logic used in conjunction with a programmable logic device such as a Field Programmable Gate Array (FPGA) or microprocessor, or any other device including any combination thereof. All such embodiments are intended to fall within the scope of the present invention.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense.

What is claimed is:

1. A method of enabling sensitive information to be masked while screensharing HTML elements, comprising the steps of:
    loading masking script to an embedded browser, the embedded browser having a DOM containing a set of HTML elements, a display of the embedded browser forming a portion of visual content of an application display;
    loading a list of CSS selectors identifying a subset of the HTML elements to be masked;
    determining, by the masking script, locations and sizes of the subset of the HTML elements identified by the list of CSS selectors within the display of the embedded browser;
    communicating a list of the locations and sizes of the subset of the HTML elements from the masking script to a screenshare client;
    redacting corresponding regions of the application display by the screenshare client, when transmitting screensharing data on a screensharing session;
    adding a mutation observer to the DOM to detect changes to the DOM;
    observing the DOM by the mutation observer to detect changes to the DOM; and
    responsive to a detected a change to the DOM:
        loading an updated list of CSS selectors;
        determining, by the masking script, new locations and sizes of the HTML elements identified by the updated list of CSS selectors within the display of the embedded browser;
        communicating the new locations and sizes of the HTML elements from the masking script to the screenshare client; and
        redacting new corresponding regions by the screenshare client when transmitting screensharing data on the screensharing session.

2. The method of claim 1, wherein the locations and sizes of the HTML elements are each specified using two respective (x,y) coordinate values identifying opposite corners of a rectangular area encompassing the respective HTML element within coordinate space of the display of the embedded browser.

3. method of claim 2, wherein the coordinate values are implemented as (x,y) offset values specifying locations relative to edge of the display of the embedded browser.

4. The method of claim 1, further comprising:
    capturing, by the screensharing client on the screensharing session, screenshare data describing visible content displayed on the application display, at least a portion of the visible content being generated by the embedded browser;

receiving, by the screensharing client, the list of locations and sizes of redacted regions within the embedded browser to be masked on the screensharing session;

correlating the list of locations and sizes within the embedded browser to redacted regions of the application display;

omitting content of the redacted regions, by the screensharing client from the screenshare data, to create redacted screenshare data, the redacted screenshare data describing visible content displayed on the application display outside of the redacted regions of the application display and not describing visible content displayed on the application display inside the redacted regions; and transmitting the redacted screenshare data on the screensharing session.

5. The method of claim 4, wherein correlating the list of locations and sizes to regions of the application display comprises determining a location of the embedded browser within the application display.

6. The method of claim 4, wherein omitting content of the redacted regions comprises capturing screenshare data describing the visible content of the application display, and removing content of the redacted regions from the captured screenshare data.

7. The method of claim 4, wherein omitting content of the redacted regions comprises determining the locations of the redacted regions, and capturing screenshare data describing the visible content of the application display outside of the redacted regions while not capturing screenshare data describing the visible content of the application display inside the redacted regions.

8. The method of claim 1, further comprising:
responsive to detecting the change to the DOM, pausing the screenshare task.

9. A method of enabling sensitive information to be masked while screensharing HTML elements. comprising the steps of:
loading masking script to an embedded browser, the embedded browser having a DOM containing a set of HTML elements, a display of the embedded browser forming a portion of visual content of an application display:
loading a list of CSS selectors identifying a subset of the HTML elements to be masked;
determining, by the masking script, locations and sizes of the subset of the HTML elements identified by the list of CSS selectors within the display of the embedded browser;
communicating a list of the locations and sizes of the subset of the HTML elements from the masking script to a screenshare client;
redacting corresponding regions of the application display by the screenshare client, when transmitting screensharing data on a screensharing session;
adding a scroll event handler to the DOM to detect scroll operations in the embedded browser;
observing the embedded browser by the scroll event handler to detect scroll events; and
responsive to detecting occurrence of a scroll event, notifying the screensharing client of an offset value associated with the scroll event.

10. The method of claim 9, further comprising:
responsive to detecting occurrence of the scroll event, pausing the screensharing task.

11. A method of enabling sensitive information to be masked while screensharing HTML elements, comprising the steps of:
loading masking script to an embedded browser, the embedded browser having a DOM containing a set of HTML elements, a display of the embedded browser forming a portion of visual content of an application display;
loading a list of CSS selectors identifying a subset of the HTML elements to be masked;
determining, by the masking script, locations and sizes of the subset of the HTML elements identified by the list of CSS selectors within the display of the embedded browser;
communicating a list of the locations and sizes of the subset of the HTML elements from the masking script to a screenshare client;
redacting corresponding regions of the application display by the screenshare client, when transmitting screensharing data on a screensharing session;
capturing, by the screensharing client on the screensharing session, screenshare data describing visible content displayed on the application display, at least a portion of the visible content being generated by the embedded browser;
receiving, by the screensharing client, the list of locations and sizes of redacted regions within the embedded browser to be masked on the screensharing session;
correlating the list of locations and sizes within the embedded browser to redacted regions of the application display;
omitting content of the redacted regions, by the screensharing client from the screenshare data, to create redacted screenshare data, the redacted screenshare data describing visible content displayed on the application display outside of the redacted regions of the application display and not describing visible content displayed on the application display inside the redacted regions;
transmitting the redacted screenshare data on the screensharing session;
determining that the embedded browser or CSS selectors has changed; and
responsive to determining that the embedded browser or CSS selectors has changed, pausing the screenshare task.

12. The method of claim 11, wherein determining that the embedded browser or CSS selectors has changed is implemented by a mutation observer loaded to the embedded browser.

13. The method of claim 11, further comprising:
observing, by a scroll event handler loaded to the embedded browser, to detect scroll events; and
responsive to detecting occurrence of the scroll event, pausing the screensharing task.

14. A method of enabling sensitive information to be masked while screensharing HTML elements comprising the steps of:
capturing, by a screensharing client on a screensharing session, screenshare data describing visible content displayed on an application display, at least a portion of the visible content being generated by an embedded browser;

receiving, by a screensharing client, a list of redacted regions within the embedded browser to be masked on the screensharing session, the list of redacted regions identifying locations of the redacted regions within the embedded browser using a coordinate system associated with the embedded browser;

correlating the list of locations and sizes within the embedded browser to redacted regions of the application display;

omitting content of the redacted regions by the screensharing client from the screenshare data to create redacted screenshare data, the redacted screenshare data describing visible content displayed on the application display with the exception of the redacted regions of the application display;

transmitting the redacted screenshare data on the screensharing session;

determining that the embedded browser or CSS selectors has changed; and responsive to determining that the embedded browser or CSS selectors has changed, pausing the screenshare task.

15. The method of claim 14, wherein correlating the list of locations and sizes to regions of the application display comprises determining a location of the embedded browser within the application display, and combining the location of the embedded browser within the application display with the locations of the redacted regions within the embedded browser.

16. The method of claim 14, wherein omitting content of the redacted regions comprises capturing screenshare data describing the visible content of the application display, and removing content of the redacted regions from the captured screenshare data.

17. The method of claim 14, wherein omitting content of the redacted regions comprises determining the locations of the redacted regions, and capturing screenshare data describing the visible content of the application display outside of the redacted regions while not capturing screenshare data describing the visible content of the application display inside the redacted regions.

18. The method of claim 14, further comprising:
observing, by a scroll event handler loaded to the embedded browser, to detect scroll events; and
responsive to detecting occurrence of the scroll event, pausing the screensharing task.

* * * * *